(12) United States Patent
Lee et al.

(10) Patent No.: US 8,454,926 B2
(45) Date of Patent: Jun. 4, 2013

(54) METHOD AND SYSTEM FOR SEPARATION OF SOLUTE FROM AN AQUEOUS SOLUTION

(75) Inventors: Robert Lee, Fremont, CA (US); Don Ireland, Delano, MN (US); Gene Chauffe, Breaux Bridge, LA (US)

(73) Assignee: Cargill, Incorporated, Wayzata, MN (US)

( * ) Notice: Subject to any disclaimer, the term of this patent is extended or adjusted under 35 U.S.C. 154(b) by 1007 days.

(21) Appl. No.: 11/670,915

(22) Filed: Feb. 2, 2007

(65) Prior Publication Data

US 2007/0207082 A1 Sep. 6, 2007

Related U.S. Application Data

(60) Provisional application No. 60/765,383, filed on Feb. 3, 2006.

(51) Int. Cl.
*C22B 26/10* (2006.01)

(52) U.S. Cl.
USPC .......... 423/499.4; 210/702; 210/705; 23/298; 23/295 R

(58) Field of Classification Search
USPC ................ 210/702, 705; 423/499.4
See application file for complete search history.

(56) References Cited

U.S. PATENT DOCUMENTS

| | | | |
|---|---|---|---|
| 3,647,396 A * | 3/1972 | DeWittie et al. | 23/299 |
| 4,678,583 A * | 7/1987 | Willson et al. | 210/638 |
| 5,167,838 A * | 12/1992 | Wilensky | 210/768 |
| 6,890,444 B1 * | 5/2005 | Max | 210/737 |

OTHER PUBLICATIONS

Bakker, R.J. et al., "Improvements in clathrate modeling: I. The $H_2O$—$CO_2$ system with various salts," Geochimica et Cosmochimica Acta, vol. 60, No. 10, pp. 1657-1681, 1996.

Bishnoi P.R. et al., "Equilibrium conditions for hydrate formation for a ternary mixture of methane, propane and carbon dioxide, and a natural gas mixture in the presence of electrolytes and methanol," Fluid Phase Equilib 1999; 158-160:821-7.

Chatti, I., "Benefits and drawbacks of clathrate hydrates: a review of their areas of interest," Energy Conversion and Management, Article in Press (2004).

Clarke, M.A. et al., "Development of a new equation of state for mixed salt and mixed solvent systems, and application to vapour-liquid and solid (hydrate)-vapour-liquid equilibrium calculations," Fluid Phase Equilibria 220 (1): 21-35, Jun. 15, 2004. (Abstract).

(Continued)

*Primary Examiner* — Melvin C Mayes
*Assistant Examiner* — Melissa Stalder

(57) ABSTRACT

Disclosed is method for separating solute from an aqueous solution comprising providing a first aqueous solution substantially saturated with solute, contacting the first aqueous solution with a clathrate former under conditions sufficient to form clathrates and to precipitate the solute from the first aqueous solution, separating solute from the clathrates by removing a first stream comprising clathrates and solute, and removing a second stream comprising solute, decomposing the clathrates into the clathrate former and a second aqueous solution, the second aqueous solution comprising solute in a concentration less than the concentration of solute in the first aqueous solution, and recycling the second aqueous solution by contacting said solution with a source for the solute to form a third substantially saturated aqueous solution for use as, or in combination with, the first aqueous solution, wherein the method is continuous.

24 Claims, 3 Drawing Sheets

OTHER PUBLICATIONS

Dyadin, Y. et al., "Clathrate hydrates of hydrogen and neon," Mendeleev Commun., 1999, 9(5), 209-210. (Abstract).

Englezos P. et al., "Prediction of gas hydrate formation conditions in aqueous electrolyte solutions," AIChE J 1988; 34(10):1718-21.

Englezos P., "Computation of the incipient equilibrium carbon dioxide hydrate formation conditions in aqueous electrolyte solutions," Ind Eng Chem Res 1992; 31(9):2232-7.

Englezos, P. "Incipient Equilibrium Data for Propane Hydrate Formation in Aqueous Solutions of NaCI, KCI, and $CaCI_2$," J. Chem. Eng. Data 1993, 38, 250-253.

Gnanendran, N. et al., "Equilibrium hydrate formation conditions for hydrotrope-water-natural gas systems," Fluid Phase Equilibria 221 (2004) 175-187.

Gnanendran, N. et al., "Modelling hydrate formation kinetics of a hydrate promoter-water-natural gas system in a semi-batch spray reactor," Chemical Engineering Science 59 (2004) 3849-3863.

Gnanendran, N. et al., "The effect of hydrotropes on gas hydrate formation," Journal of Petroleum Science & Engineering 40 (2003) 37-46.

http://www.cdgdc.edu/cn/yxbslw/pxjg/2004/abstract/sunchangyu.htm Feb. 4, 2005 (5 pages). (Abstract).

Kang, S.P. et al., "Hydrate phase equilibria of the guest mixtures containing CO2, N-2 and tetrahydrofuran," Fluid Phase Equilibria, 185 (1-2): 101-109, Jul. 30, 2001. (Abstract).

Li, X. et al., "Thermodynamic inhibitors for Hydrate Plug Melting," Annals New York Academy of Sciences, pp. 822-831.

Masoudi, R. et al., "Experimental measurement and thermodynamic modeling of clathrate hydrate equilibria and salt solubility in aqueous ethylene glycol and electrolyte solutions," Fluid Phase Equilibria 219 (2): 157-163, May 28, 2004. (Abstract).

Mooijer—van den Heuvel, M.M., "Hydrate Promoting Capabilities of some in Water Soluble and Insoluble Organics on the Formation of Methane Gas Hydrate," Entropie No. 224/225, 2000, pp. 50-55.

Sloan, E.D., "Clathrate Hydrates of Natural Gas," Fundamental Phase Equilibrium Calculations, Chapter 4, pp. 138-144.

Sun Z.G. et al., "Equilibrium conditions hydrate dissociation for a ternary mixture of methane, ethane, and propane in aqueous solutions of thylene glycol and electrolytes," J. Chem Eng Data 2001; 46(4):927-9.

Tanaka, H., "On the thermodynamic stability of clathrate hydrates," Can. J. Phys/Rev. Can. Phys. 81(1-2): 55-60 (2003). (Abstract).

Vaessen, R.J.C., "Shifting Eutectic Conditions by Use of $CO_2$ Clathrates in Eutectic Freeze Crystallization," Industrial Crystallization 1999, JChemE, pp. 1-12.

van der Ham, F. et al., "Eutectic freeze crystallization: Application to process streams and waste water purification," Chemical Engineering and Processing 37 (1998) 207-213.

International Search Report for PCT/US07/61570 dated Oct. 1, 2007 (2 pages).

* cited by examiner

METHOD AND SYSTEM FOR SEPARATION OF SOLUTE FROM AN AQUEOUS SOLUTION

CROSS-REFERENCE TO RELATED APPLICATIONS

This application claims the benefit of U.S. Provisional Patent Application Ser. No. 60/765,383, filed Feb. 3, 2006, which is incorporated herein by reference.

FIELD OF THE INVENTION

This invention relates to the separation of a solute from an aqueous solution.

BACKGROUND OF THE INVENTION

In solution mining fresh and/or recycled water is injected through a well (or wells) drilled into an underground salt bed or salt dome, usually between 150 and 1,500 meters (500 to 5000 feet) deep. Dissolution of the salt forms a void or cavern in the salt deposit. Salt brine is withdrawn from the cavern and transported by pipeline to an onsite evaporating plant to make dry salt.

Because of the high energy costs associated with treatment of the salt brine from this or other salt sources, there is a need in the art for alternate methods and systems to separate the salt in an aqueous solution to produce substantially dry salt of high purity.

SUMMARY OF THE INVENTION

One embodiment of the present invention is a method for separating solute from an aqueous solution comprising providing a first aqueous solution substantially saturated with solute, contacting the first aqueous solution with a clathrate former or formers under conditions sufficient to form clathrates and to precipitate the solute from the first aqueous solution, separating solute from the clathrates by removing a first stream comprising clathrates and solute, and removing a second stream comprising solute, decomposing the clathrates into the clathrate former and a second aqueous solution, the second aqueous solution comprising solute in a concentration less than the concentration of solute in the first aqueous solution, and recycling the second aqueous solution by contacting said solution with a source for the solute to form a third substantially saturated aqueous solution for use as, or in combination with, the first aqueous solution, wherein the method is continuous.

Another embodiment of the present invention is a method for continuously separating sodium chloride from an aqueous solution comprising providing a first aqueous solution comprising sodium chloride, contacting the first aqueous solution with a clathrate former under conditions sufficient to form clathrates and to precipitate sodium chloride, and continuously separating sodium chloride from the clathrates by removing a first stream comprising clathrates and removing a second stream comprising sodium chloride wherein said separating step occurs in the same reactor as the contacting step.

Another embodiment of the present invention is a system for separating sodium chloride from an aqueous solution comprising a clathrate forming unit comprising a clathrate forming reactor, a clathrate former input stream and an aqueous solution input stream, and a clathrate recycling unit comprising a clathrate decomposition reactor, a clathrate former recycle stream fluidically coupled to the clathrate decomposition reactor and the clathrate former reactor or an input stream thereof, and a water recycle stream fluidically coupled to the clathrate decomposition reactor, a salt source and the clathrate forming reactor or an input stream thereof.

These and other aspects of the present invention are elucidated further in the detailed description.

DETAILED DESCRIPTION

Figure 1:
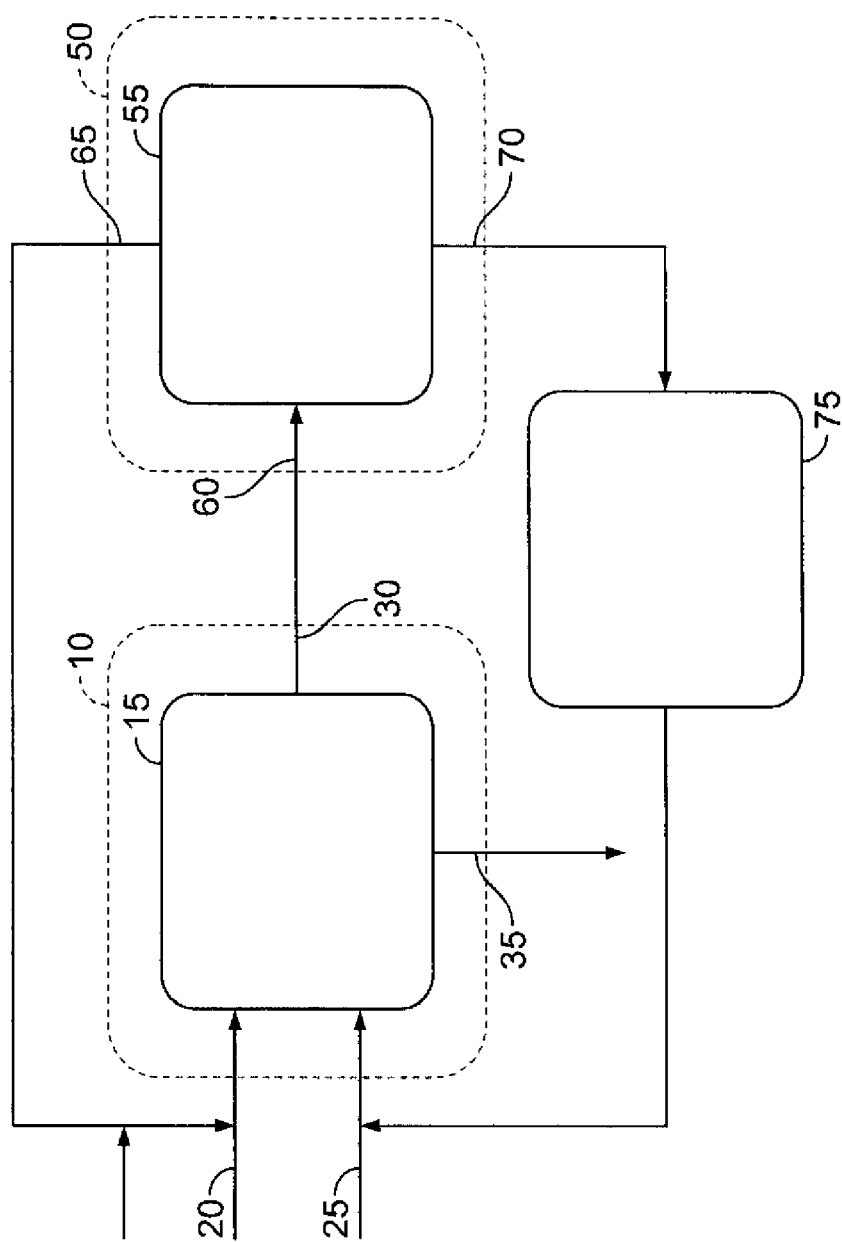
FIG. 1 shows a system for use in separating salt from an aqueous solution recovered.

The following description of the invention is intended to illustrate various embodiments of the invention. As such, the specific modifications discussed are not to be construed as limitations on the scope of the invention. It will be apparent to one skilled in the art that various equivalents, changes, and modifications may be made without departing from the scope of the invention, and it is understood that such equivalent embodiments are to be included herein.

In an embodiment of the present invention, a method is described for the separation of salt from substantially saturated brine comprising providing a first aqueous solution (or input brine) substantially saturated with sodium chloride. The source for the first aqueous solution may be any salt source including, but not limited to, a brine well. In variations of the current embodiment, the source for the first substantially aqueous solution may include solar brines in salt concentration ponds, or rock salt mines, or any other source of salt from which a brine may be obtained. In another alternative to the present embodiment the first aqueous solution may have a sodium chloride concentration less than that of a saturated solution such that the present method may be employed to concentrate said solution and/or to separate the salt from the solution. The input solution may also be presaturated with the clathrate former as set forth below. In the case of solution/clathrate system of brine and carbon dioxide, the brine may be presaturated with carbon dioxide by the addition of sodium bicarbonate to the brine.

It is to be understood that the present embodiment may be employed to separate or concentrate with various solutions such as for example, sodium or other hydroxides or salt solutions wherein the salt is selected from inorganic salts such as the sodium, potassium, magnesium, calcium, iron, and ammonium salts of chloride, sulfate, nitrate, phosphate, and carbonate or organic salts such as the sodium, potassium, magnesium, calcium and ammonium salts of formate, acetate, gluconate, propionate, and hydroxypropionate.

The first aqueous solution is contacted with a clathrate former under conditions sufficient to form clathrates comprising the clathrate former and water. This step may include methods to promote contact between the clathrate former and first aqueous solution thus promoting the formation of clathrates. Such methods may include, but are not limited to agitation, for a gas clathrate former, bubbling the clathrate former through the first aqueous solution, spraying an input solution into an atmosphere of clathrate former, or spraying a clathrate former into an input solution. It has been found that when bubbling the clathrate former through the solution, smaller bubble sizes and fasted flow rates have improved the rate of formation of the clathrate. It is to be understood that in the alternative, one or more clathrate formers may be employed with the present embodiment. Further, the clathrate former may be introduced in a gaseous, liquid or solid state, or may be aqueously dissolved directly into the solution (for example, presaturated) to be separated via a membrane or other method. Further, clathrate formation and or separation may be improved by seeding the reaction by either clathrate, crystallized solute or both, or disruption of the clathrate by mechanical agitation or the use of ultrasound, which may decompose or shear the clathrate during formation.

Many clathrate formers will form clathrates at various pressures and temperatures, in both liquid and gaseous form, and include both inorganic and organic compounds. Examples of suitable clathrate formers include, but are not limited to, most low molecular weight gases such as $O_2$, $N_2$, $CO_2$, $H_2S$, Ar, Kr, and Xe. Other examples of clathrate formers include, but are not limited to, $CH_3CCl_2F$, $CH_3CClF_2$, $CH_3CHF_2$, $CHClF_2$, $C_3H_6$, $CH_2ClF$, $CH_3Cl$, $Cl_2$, and hydrocarbon gases such as methane, propane, ethane, and butane. Other clathrate formers are described in Sloan, E. D., Clathrate Hydrates of Natural Gases (1998) which is incorporated herein by reference. Conditions such as pressure and temperature sufficient to form clathrates will vary depending on the clathrate former selected. Further, the rate of formation may be varied based on the selection of clathrate former and the operating conditions selected. It has been found that by varying the conditions and addition rate of clathrate former, by, for example, slow addition of clathrate former, crystal growth can also be controlled. It has been found that the slow cooling of the clathrate former/solution results in the formation of larger clathrate crystals, which may have advantages, such as ease of separation.

Other additives may also be employed to promote or inhibit clathrate formation or modify reaction conditions. For example, substances which have considerable solubility in the aqueous phase, such as alcohols, glycols, and salts, normally act as inhibitors to hydrate formation. The mechanism for inhibition of formation may stem from the increase competition for the water molecules by the dissolved inhibitor molecule or ion. Examples of such substances include urea, ammonia. Other techniques and combinations for inhibiting hydrate growth may include anti-agglomerant methods for stabilizing the water phase internal to a liquid hydrocarbon phase as an emulsion using a surfactant, and/or the kinetic inhibition method of preventing sizable crystal growth for a period exceeding the free water residence time in a pipeline. Surfactants that provide a relatively stable water-in-oil emulsion may be effective as anti-agglomerants. Combinations of anti-agglomerants and kinetic inhibitors may also be employed. Sloan, E. D., Clathrate Hydrates of Natural Gases pp. 138-144. Other promoters may include one or more of: THF, SO2, H2S, PVP, PVCAP, VC-713, various surfactants that promote rate of formation, but do not alter thermodynamics such as ionic surfactants, non-ionic surfactants, block copolymers, NH3, NO2, N2O, NO, acids that increase the equilibrium solubility of the clathrate former and/or shift the equilibrium in favor of clathrate, bases, silica gel pores, 1,3-dioxolane, tetrahydropyran, cyclobutanone, methylcyclohexanone, fluroform, tetrafluoromethane, tetrahydrofuran, para-toluene sulfonic acid, H2S, SO2, acetone, propyleneoxide, PEO, PPO, alcohols, polyols, quaternary phosphonium salts, polymers or copolymers with hydroxyl groups, halogenated hydrocarbons, sulfur containing compounds, organic salts, 1,3-dioxolane, tetrahydropyran, cyclobutanone, methylcyclohexanone, fluroform, tetrafluoromethane, tetrahydrofuran, quaternary ammonium salts, cyclopentane, cyclohexane, diethanolamine, chloroform, ethylenechloride, carbon tetrachloride, sodium dodecyl sulfate, methanol in dilute concentrations, and ethanol in dilute concentrations. Other inhibitors may include: NaCl, KCl, CaCl2, mono-ethylene glycol, di-ethylene glycol, and tri-ethylene glycol.

As clathrates are formed in the clathrate forming reactor 15, water is removed from the first aqueous solution. As water is removed, sodium chloride will precipitate out of the first aqueous solution. In the alternative, at certain temperatures and pressures, such as below 32° F., the precipitated sodium chloride will be in the form of sodium chloride dihydrate.

As clathrates are formed, they may be separated from the remaining first aqueous solution and precipitated sodium chloride or sodium chloride dihydrate by removing a clathrate output stream. The clathrate output stream may also include sodium chloride or other components present in the system, for example crystalline sodium chloride or sodium chloride dihydrate that adheres to the clathrates prior to the clathrates' separation, or the first aqueous solution that is drawn off with the clathrates. For example, a portion of the first aqueous solution may be drawn off with the clathrate output stream such that the clathrate output stream is in the form of a slurry of clathrate and saturated brine for ease in removal. In addition, the clathrate output stream may comprise impurities that are present in the input solution such as magnesium or calcium chloride or magnesium or calcium sulfate. In the alternative the impurities may be drawn off in a separate stream.

One method for separation of the clathrates from the remaining first aqueous solution and the sodium chloride or sodium dihydrate prior to the clathrates' removal in the clathrate output stream is through gravitational separation. By allowing clathrates, having a lower density than the first aqueous solution, to rise in the mixture, the clathrates can be removed from the top of the first aqueous solution. Various methods may be employed to remove the clathrates such as gravity separation, centrifugation, hydrocloning, or filtration. It has been found that solutes of higher density are more easily separated through the aforementioned techniques, and a such, processes involving separation of those solutes can be configured as disclosed herein to use the density differences in the separation process. Further, separation may be assisted by the incorporation of one or more settling zones within the formation zone, by for example, providing one more weirs to slow flow of the clathrate/solution mixture with a reactor or formation chamber.

A salt output stream comprising crystallized salt or sodium chloride dihydrate may also be removed from the contacted mixture. The salt output stream may be removed in the form of a slurry for ease in removal. The salt output stream and or the clathrate output stream may be first extruded to remove excess brine prior to further processing. If the salt output stream includes brine, additional salt fines that may not otherwise be usable can be added reduce the capacity of the brine to dissolve the newly formed salt crystals, particularly if sodium dihydrate is decomposed during the method.

The clathrates of the clathrate output stream may then be decomposed into the clathrate former and a second aqueous solution, where the second aqueous solution may comprise sodium chloride, but in a concentration less than the concentration of sodium chloride in the first aqueous solution. The clathrate former and second aqueous solution may then be separated by techniques known in the art depending on the specific clathrate former. For example, if the clathrate former is a gas at the decomposition conditions of the clathrate, then the clathrate former will bubble out of the remaining clathrates and second aqueous solution upon an increase in temperature and/or decrease in pressure. Further, the clathrate may be washed prior to separation by, for example, additional clathrate former or solution to be separated, prior to decomposition. The clathrate/solution may be frozen prior to decomposition to further assist in separation of the mixture.

The second aqueous solution may then be recycled for reuse in the method. An example of said use is to contact the recycled second solution with a salt source such as a brine well to form a substantially saturated third aqueous solution for use as, or in combination with, the first aqueous solution.

If sodium chloride dihydrate is formed during the clathrate forming step, after separation from the clathrates and first aqueous solution, the sodium chloride dihydrate may be decomposed to form crystalline salt comprising less than about 5% water, and a fourth aqueous solution comprising substantially saturated brine. The fourth aqueous solution may then be recycled for use as, or in combination with, the first aqueous solution.

The crystalline salt may then be further processed by, for example washing and/or drying, to produce purified salt substantially free of water. In normal operation, and depending on the level of impurities in the input brine, often it is found that most impurities are removed from the salt in the clathrate forming step such that little or no further treatment is necessary. In the alternative, particularly where the input brine comprises substantial impurities, for example 80% sodium chloride and 20% impurities, the present method may be used to lower the level of impurities as described herein for further processing of the salt.

The method of the present embodiment may be operated as continuous, semi-continuous or batch as desired. The present method may also be modified to include multiple vessels and or multi-staging of the various steps set forth herein to improve separation.

Referring to FIG. 1, in another embodiment of the present invention a system is described for use in separating sodium chloride from an aqueous solution recovered from a brine well, the system comprising a clathrate forming unit 10 further comprising a clathrate forming reactor 15, a clathrate former input stream 20, a first aqueous solution input stream 25, a clathrate output stream 30, and a salt output stream 35. In the alternative, the first aqueous solution input stream 25 may be at the top of the clathrate forming reactor 15.

The clathrate forming reactor 15 may be any reactor, vessel, mixing chamber, tube, or other, suitable for contacting a clathrate former and a first aqueous solution to form clathrate at desired temperature and pressure including, but not limited to, continuously stirred tank reactors or plug flow reactors.

The clathrate forming unit 10 may include a temperature controller or control system, a pressure controller or control system, or both to allow control of the operating conditions of the unit.

In a variation of the present embodiment, the clathrate forming reactor 15 is configured such that countercurrent flow of the clathrate former and the aqueous solution is accomplished. The countercurrent flow improves the contacting of the clathrate former and first aqueous solution to increase the formation of clathrate. When the clathrate former is a gas at the operating conditions of the clathrate forming reactor 15, countercurrent flow may be accomplished by bubbling the clathrate former through the first aqueous solution in the clathrate forming reactor 15.

In another variation of the present embodiment, the first aqueous solution input stream 25 or a portion thereof may be introduced into the clathrate forming reactor at the bottom of said reactor 15 such that the first aqueous solution input stream 25 washes or partially washes the precipitated solute prior to withdrawing the solute from the clathrate forming reactor 15.

The system of the present embodiment further comprises a clathrate recycling unit 50 comprising a clathrate decomposition reactor 55, a clathrate input stream 60 in fluid communication with the clathrate output stream 30 and the clathrate decomposition reactor 55, a clathrate former recycle stream 65 in fluid communication with the clathrate decomposition reactor 55 and the clathrate former input stream 20, and a solvent recycle stream 70 in fluid communication with the clathrate decomposition reactor 55, a salt source 75 and the first aqueous solution input stream 25. In the present embodiment, the salt source is a brine well. As set forth herein, in variations of the current embodiment, the source for the first substantially aqueous solution may include other salt sources such as solar salt or rock salt.

The clathrate recycling unit 50 may include a temperature controller or control system, a pressure controller or control system, or both to allow control of the operating conditions of the unit. Further, said temperature and or pressure controllers or control systems may be same as, or in communication with, the temperature and/or pressure controllers or control systems of the clathrate forming unit 10.

The clathrate decomposition reactor 55 may be any reactor, vessel, mixing chamber, tube, or other, suitable for decomposition of clathrate. To effect the decomposition of the clathrates, the clathrate decomposition reactor 55 may operate at either decreased pressure or increased temperature, or both, when compared to the clathrate forming unit 10. Upon decomposition of the clathrates into clathrate former and water, depending on the clathrate former, the clathrate former and water and/or other constituents must be separated. If the clathrate former is gas at the operating conditions of the clathrate decomposition reactor 55, the clathrate former will bubble out of the remaining aqueous solution and can be drawn form the clathrate decomposition reactor 55 via the clathrate former recycle stream 65. In the alternative, if the clathrate former is a liquid that is immiscible in water and less dense than water the clathrate former may be skimmed off the surface of the remaining aqueous solution. Any other components present in the clathrate former input stream, such as sodium chloride, will then usually dissolve in the water, which can then be drawn from the clathrate decomposition reactor 55 via the solvent recycle stream 70.

In the alternative, where the remaining aqueous solution comprises dissolved clathrate former, the clathrate former may be removed from said solution via vacuum extraction or the like, thus recovering additional clathrate former for reuse in the system.

While it is preferred that the sodium chloride concentration in the clathrate decomposition unit 50 be minimized, it is acceptable to have concentration up to about 10% or more by weight, or about 5% to 7% by weight. The sodium chloride concentration in the clathrate output stream 30 and thus in the clathrate decomposition unit 50 is due to sodium chloride, either crystalline or in solution, carried with the clathrates in the clathrate output stream 30 and often depends of the flow rate of the clathrates from the clathrate forming reactor 15.

As clathrates are formed in the clathrate forming reactor 15 a sodium chloride precipitate will also form. The second output stream 35 is configured to carry the sodium chloride precipitate from the clathrate forming unit 15 for further processing. As set forth herein, depending on the operating conditions of the clathrate forming unit, the sodium chloride precipitate will be either sodium chloride or sodium chloride dihydrate. Either precipitate may be further processed to produce crystalline salt substantially free of water. In the case of sodium chloride dihydrate, as the temperature of the sodium chloride dihydrate is elevated, saturated brine and crystalline salt will be formed. The saturated brine can then be recycled back into the clathrate forming reactor 15 or an input stream thereof, and the crystalline sodium chloride can the be further processed by, for example, a drying process to remove any remaining water in the crystalline sodium chloride.

In another embodiment, a system is described comprising the system of FIG. 1, and further comprising one or more heat exchange systems to increase or decrease the operating temperature of the reactors and/or flow streams of the present embodiment. The heat exchangers may be configured to minimize the energy necessary to operate the system. For example, a refrigerant is passed through a heat exchanger to cool the clathrate forming reactor 15. Refrigerant at an elevated temperature relative to the input refrigerant can then be directed to either 1) the clathrate decomposition reactor 55 to elevate the temperature of said reactor to effect the decomposition of the clathrate, or 2) to the solvent recycle stream 70 to cool the refrigerant, thus conserving energy used in the system.

In another embodiment of the present invention, a method for salt production is described wherein by said method impure salt or an impure salt brine is processed to produce salt of a higher purity, the method comprising providing an input brine of approximately 80% purity of sodium, chloride and removing water and impurities from said brine by the formation of clathrates as described herein. It is to be understood that the input brine may be of any level of purity, such as less than 80%, 80% to 90%, 80% to 95%, or up to 99.9% and type of impurity, include those described herein, such that through the removal of water during clathrate formation, sodium chloride is precipitated while the impurities remain dissolved in the remaining brine. In the method of the present embodiment, in addition to removal of a clathrate stream and a precipitated solute stream from a clathrate forming vessel, and additional waste stream may be draw from the clathrate formation vessel.

Said embodiment may be used a preprocessing step for "pickle brines" and the like, thus replacing common steps currently employed in salt production such as crystallizing, redissolving, and chemically treating of pickle brines prior to evaporation treating.

It is contemplated that in the present embodiment, any solute/solvent system may be purified by the formation of clathrates if the impure components will remain dissolved in the solvent at conditions sufficient to form clathrates and precipitate of the solute. Further any level of impurities may be either removed or minimized through said method.

In additional embodiments it is contemplated that the systems and methods described above could be used to separate any solute from any solvent, if the solvent will form a clathrate, through clathrate formation. Further, the above methods and systems may be employed with both substantially saturated solutions and solutions not substantially saturated, where said methods or systems are used to concentrate unsaturated solutions if desired.

EXAMPLE I

Figure 2:
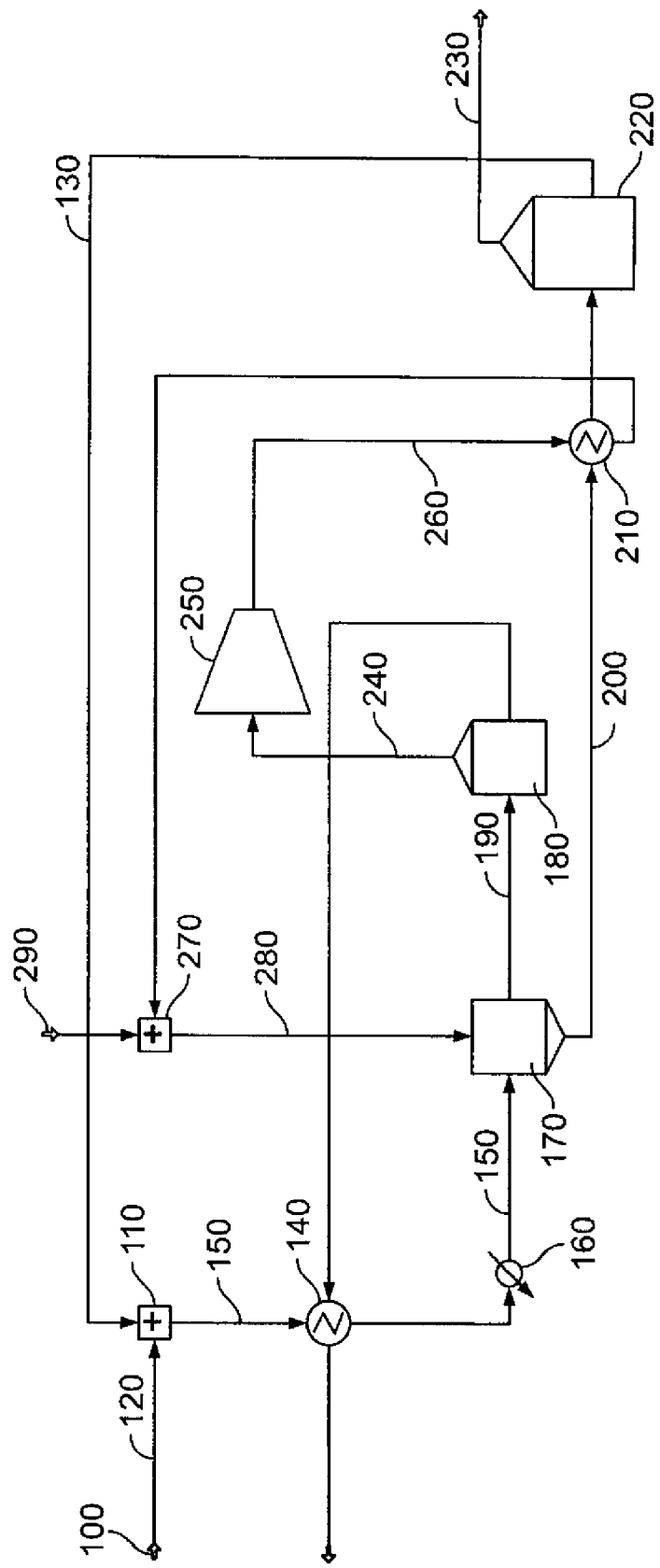
FIG. 2 shows an example of a method and system for the production of food grade salt from saturated brine via clathrate formation.

Referring to FIG. 2, a method and system for the production of food grade salt from saturated brine from a brine well through clathrate formation, wherein the clathrate former is carbon dioxide, is described. A first saturated brine 100 is recovered from a brine well at 15° C. The brine may be provided at any temperature depending on the specific source. For example the brine source may be between 30° F. to 100° F., 40° F. to 70° F., or about 50° F. The first saturated brine 100 is provided to a mixer 110 via stream 120 where it is mixed with recycled saturated brine 130 provided at 36.3° F. The mixture is then passed through a first heat exchanger 140 via stream 150 where it is cooled to 15.4° F. The mixture is then passed through a second heat exchanger 160 and cooled to −9.4° F. The second heat exchanger 160 may include any means known in the art to cool the mixture to the desired temperature.

The cooled mixture is then provided to a clathrate forming reactor 170 via stream 150 for contacting with the clathrate former, $CO_2$. The clathrate former is provided at 350 psig and 18.5° F. Clathrate formation occurs in the clathrate forming reactor 170 such that clathrates and a salt slurry are formed. At said operating conditions the salt slurry comprising sodium chloride dihydrate.

It is contemplated that conditions suitable for clathrate formation using CO2 as the clathrate former include temperatures between −6° F. to 28° F., or 0° F. to 25° F., 9° F. to 22° F., or 25° F., and pressures 150 psig to 600 psig, 300 psig to 550 psig or 500 psig. It is possible to use higher temperatures and higher pressures. However, as both are increased thermodynamic advantages of the present example are diminished.

It is further contemplated that one could adjust the temperature and pressure if a different clathrate former is selected.

The clathrates are separated from the salt slurry by gravitational separation as the clathrates are of a lower density than the salt slurry. The clathrates can then be drawn from the clathrate forming reactor 170 and provided to a clathrate decomposition reactor 180 via stream 190.

The salt slurry is drawn from the clathrate forming reactor 170 via stream 200 and passed through a heat exchanger 210 where the temperature of the salt slurry is raised to 36.3° F. As the temperature is raised, sodium chloride dihydrate in the salt slurry decomposes into crystalline salt and saturated brine. The mixture is separated in separator 220 such that recycled saturated brine 130 at 36.3° F. and approximately 26% sodium chloride by weight is drawn from the separator 220 via stream 130 and salt comprising 3% water by weight at 36.3° C. is drawn from the separator 220 via stream 230, which may be drawn from the bottom of the separator 220. The separator 220 may be any separation equipment known in the art suitable for said separation, such as a liquid/solid separator, centrifuge or filter. The recycled saturated brine may then be provided via stream 130 to mixer 110 to be mixed with the saturated brine 100 as set forth herein. The salt may be further processed to form food grade salt by methods known in the art such as washing and drying. In addition it is possible to further process the salt to produce commercial size salt crystals by growing the crystals in the decomposition vessel or in a separate crystal growth vessel following decomposition.

Sufficient crystal growth is accomplished by decomposition the sodium chloride dihydrate at conditions sufficient to form sodium chloride crystals of a size suitable for commercial applications. The crystal size is preferably about USS 30 pass and USS 70 retain, but may be different depending on the desired application. In the present example slow warming, such as ambient heating of the dihydrate to decomposition temperature, and minimal agitation will result in crystals of ideal size.

The clathrates provided to the clathrate decomposition reactor 180 are decomposed to form clathrate former and solvent. Any salt present will dissolve in the solvent. Clathrate decomposition is accomplished at 92.6 psig and 3.2° F. At said conditions the clathrate former will bubble out of the solvent and may be removed from the clathrate decomposition reactor 180 via stream 240. It is contemplated that the clathrate may be decomposed by raising the temperature or decreasing the pressure. Preferable ranges include 25° F. to 40° F. and 350 psig to 600 psig, or 36° F. and 500 psig.

The clathrate former is then compressed to 0.350 bar at 227.3° F. in compressor 250 and transported via stream 260 through heat exchanger 210 where the temperature of the clathrate former is decreased to 18.5° F. The clathrate former is then mixed with makeup clathrate former 290 if necessary at mixer 270 and provided to the clathrate forming reactor 170 via stream 280 for reuse in the system.

EXAMPLE II

Figure 3:
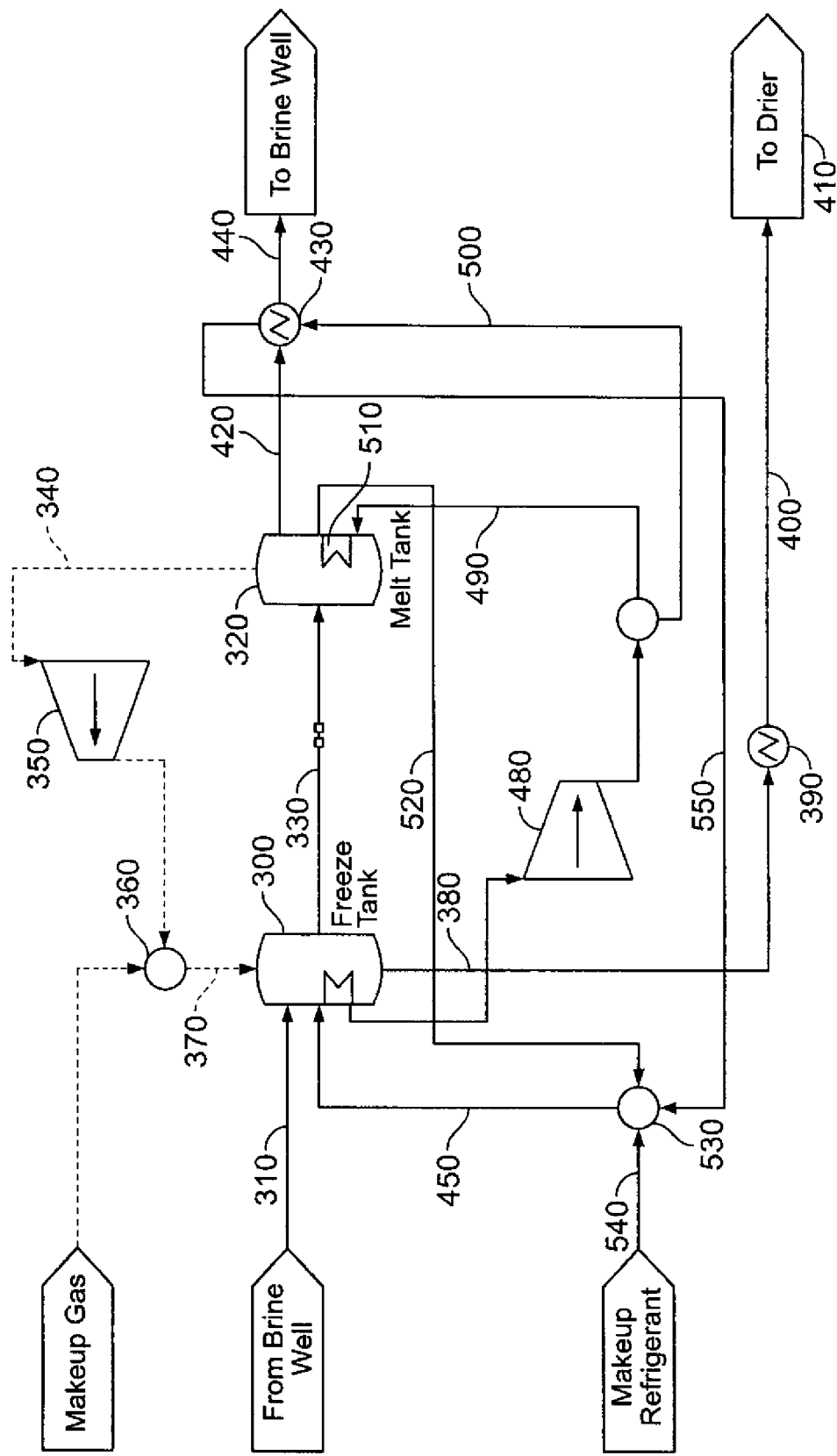
FIG. 3 shows an example of a method and system for the production of food grade salt from saturated brine via clathrate formation.

Referring to FIG. 3, another method and system for the production of food grade salt from a saturated brine from a brine well via clathrate formation, wherein the clathrate is carbon dioxide, is described. A first saturated brine is recovered from a brine well and provided to a freeze tank 300 via stream 310 where it is mixed with a clathrate former, $CO_2$, under conditions sufficient to form clathrates and a salt slurry. In the present example the conditions chosen are 9° F. and 350 psig. The salt slurry comprises sodium chloride dihydrate which forms under said operating conditions of the freeze tank 300. The clathrate and the salt slurry are separated by gravity while in freeze tank 300.

The clathrates are then drawn from the freeze tank 300 and provided to a melt tank 320 via stream 330. The conditions of the melt tank 320 are such that the clathrate decomposes to form water and gaseous $CO_2$, specifically 14° F. and 340 psig. Any sodium chloride present in melt tank 320, such as crystalline salt, will dissolve in the water formed from decomposition of the clathrates to form an unsaturated brine having a sodium chloride concentration of approximately 7%. The $CO_2$ will bubble out of the mixture and can be drawn from the melt tank 320 via stream 340 where it is passed through a compressor 350 and mixed with makeup gas at mixer 360 and provided to the freeze tank 300 via stream 370.

The unsaturated brine formed in the melt tank 320 may be drawn form melt tank 320 via stream 420 passed through a heat exchanger 430 to recover energy used to maintain the conditions of freeze tank 300, transported via stream 440 to the brine well to dissolve additional sodium chloride, and then transported via stream 310 into freeze tank 300.

The salt slurry is drawn from the freeze tank 300 via stream 380 and may be passed through a heat exchanger 390 to recover energy used to cool the freeze tank 300 and then transported via stream 400 to a drier 410 for further processing.

The system of Example II further comprises an ammonia refrigeration cycle for cooling and heating within the system wherein a refrigerant is transported via stream 450 to freeze tank 300 where it is passed through heat exchange 460 to cool the freeze tank 300. The refrigerant is then transported via stream 470 through a compressor 480. The stream is then split into stream 490 and stream 500.

The refrigerant is transported via stream 490 to heat exchanger 510, used to increase the temperature of the melt tank 320, and then transported through stream 520 to mixer 530 where it is mixed with additional refrigerant including makeup refrigerant from stream 540 if necessary. The refrigerant is also transported via stream 500 to heat exchanger 430 to recover energy from stream 420 as described herein. The refrigerant is then transported via stream 550 to point 530 where is also mixed with makeup refrigerant and recycled through the refrigeration cycle via stream 450.

As stated above, the foregoing is merely intended to illustrate various embodiments of the present invention. The specific modifications discussed above are not to be construed as limitations on the scope of the invention. It will be apparent to one skilled in the art that various equivalents, changes, and modifications may be made without departing from the scope of the invention, and it is understood that such equivalent embodiments are to be included herein. All references cited herein are incorporated by reference as if fully set forth herein.

What is claimed is:

1. A method for separating solute from an aqueous solution comprising:
    providing a first aqueous solution comprising a solute, wherein the first aqueous solution is substantially saturated with the solute and wherein the solute is a salt;
    contacting the first aqueous solution with a clathrate former under conditions sufficient to form clathrates and to precipitate the solute from the first aqueous solution;
    separating precipitated solute from the clathrates by removing a first stream comprising clathrates and solute, and removing a second stream comprising precipitated solute;
    decomposing the clathrates into the clathrate former and a second aqueous solution, the second aqueous solution comprising solute in a concentration less than the concentration of solute in the first aqueous solution; and
    recycling the second aqueous solution by contacting the second aqueous solution with a source for the solute to form a third aqueous solution for use as, or in combination with, the first aqueous solution.

2. The method of claim 1 wherein the method is continuous.

3. The method of claim 1 wherein the solute is a chloride salt.

4. The method of claim 1 wherein the solute is sodium chloride.

5. The method of claim 4 wherein the precipitated solute is sodium chloride dihydrate.

6. The method of claim 5 wherein the second stream comprises a slurry.

7. The method of claim 6 wherein the first stream comprises a slurry.

8. The method of claim 5 further comprising decomposing the sodium chloride dihydrate to form crystalline salt comprising less than about 5% water, and a fourth aqueous solution comprising substantially saturated brine; recycling said fourth aqueous solution for use as, or in combination with, the first aqueous solution, wherein the sodium chloride dihydrate is decomposed at conditions sufficient to form sodium chloride crystals of sufficient size for commercial use.

9. The method of claim 8 wherein more than 80% by weight of the sodium chloride crystals are in a size sufficient to pass USS 30 and retain USS 70.

10. The method of claim 8 wherein more than 90% by weight of the sodium chloride crystals are in a size sufficient to pass USS 30 and retain USS 70.

11. The method of claim 8 further comprising processing the crystalline salt.

12. The method of claim 11 wherein processing the crystalline salt comprises drying the crystalline salt.

13. The method of claim 5 further comprising recovering energy used in the method by the use of one or more heat exchangers.

14. The method of claim 13 wherein the step of recovering energy comprises cooling the first aqueous solution prior to contacting said solution with the clathrate former with energy absorbed by the step of decomposing the clathrates into the clathrate former and a second aqueous solution.

15. The method of claim 4 wherein the sodium chloride is precipitated at conditions sufficient to form crystalline sodium chloride of sufficient size for commercial use.

16. The method of claim 14 wherein more than 80% by weight of the precipitated sodium chloride crystals are in a size to pass USS 30 and retain USS 70.

17. A method for continuously separating sodium chloride from an aqueous solution comprising:
   providing a first aqueous solution substantially saturated with sodium chloride;
   contacting the first aqueous solution with a clathrate former under conditions sufficient to form clathrates and to form sodium chloride dihydrate;
   continuously separating sodium chloride dihydrate from the clathrates by removing a first stream comprising clathrates and sodium chloride, and removing a second stream comprising sodium chloride dihydrate;
   decomposing the clathrates into the clathrate former and a second aqueous solution, the second aqueous solution comprising sodium chloride in a concentration less than the concentration of sodium chloride in the first aqueous solution, recycling the second aqueous solution by contacting said solution with a salt source to form a third substantially saturated aqueous solution for use as, or in combination with, the first aqueous solution;
   decomposing the sodium chloride dihydrate to form salt comprising less than about 5% water, and a fourth aqueous solution wherein the fourth aqueous solution is substantially saturated with sodium chloride;
   recycling the fourth aqueous solution for use as, or in combination with, the first aqueous solution.

18. The method of claim 17 wherein the sodium chloride dihydrate is decomposed at conditions sufficient to form sodium chloride crystals of sufficient size for commercial use.

19. The method of claim 18 wherein a majority of the sodium chloride crystals are in a size sufficient to pass USS 30 and retain USS 70.

20. The method of claim 11 further comprising drying the crystalline salt.

21. The method of claim 18 further comprising processing the crystalline salt.

22. The method of claim 21 wherein processing the crystalline salt comprises drying the crystalline salt.

23. The method of claim 22 further comprising recovering energy used in the method by the use of one or more heat exchangers.

24. The method of claim 23 wherein the step of recovering energy comprises cooling the first aqueous solution prior to contacting said solution with the clathrate former with energy absorbed by the step of decomposing the clathrates into the clathrate former and a second aqueous solution.

\* \* \* \* \*